United States Patent
Choi

(10) Patent No.: US 11,548,167 B2
(45) Date of Patent: Jan. 10, 2023

(54) ROBOT FOR MAKING COFFEE AND METHOD FOR CONTROLLING THE SAME

(71) Applicant: LG ELECTRONICS INC., Seoul (KR)

(72) Inventor: Taeyoung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 369 days.

(21) Appl. No.: 16/590,092

(22) Filed: Oct. 1, 2019

(65) Prior Publication Data

US 2021/0008729 A1 Jan. 14, 2021

(30) Foreign Application Priority Data

Jul. 12, 2019 (KR) .................. 10-2019-0084783

(51) Int. Cl.
*B25J 13/08* (2006.01)
*B25J 9/16* (2006.01)
(Continued)

(52) U.S. Cl.
CPC ........... *B25J 13/085* (2013.01); *B25J 9/0096* (2013.01); *B25J 9/1679* (2013.01); *B25J 11/0045* (2013.01)

(58) Field of Classification Search
CPC . B25J 13/00; B25J 13/08; B25J 13/085; B25J 9/00; B25J 9/16; B25J 9/1628; B25J 9/1679; B25J 9/0096; B25J 9/1633; B25J 11/00; B25J 11/0045; B25J 19/00; B25J 19/02; G05B 2219/39; G05B 2219/39271; G05B 2219/39342; G05B 2219/39343; G05B 2219/40; G05B 2219/40411; A47J 31/06; A47J 31/0657; A47J 31/08; A47J 31/085; A47J 31/24; A47J 31/30; A47J 31/303; A47J 31/32; A47J 31/34; A47J 31/36; A47J 31/3604

(Continued)

(56) References Cited

U.S. PATENT DOCUMENTS

2018/0236659 A1* 8/2018 Hogan ................... B25J 9/1661
2019/0054620 A1* 2/2019 Griffiths ................. B25J 9/1666
(Continued)

FOREIGN PATENT DOCUMENTS

KR 10-1963657 B1 3/2019

*Primary Examiner* — Khoi H Tran
*Assistant Examiner* — Sarah A Tran
(74) *Attorney, Agent, or Firm* — Birch, Stewart, Kolasch & Birch, LLP

(57) ABSTRACT

A robot for making coffee and a method for controlling the same are provided to couple or decouple a portafilter to or from an espresso machine without damage to the espresso machine or the portafilter due to a collision between the espresso machine and the portafilter. The robot includes a robot arm to move with a predetermined degree of freedom, a gripper provided in the robot arm to grip a portafilter, a torque sensor provided in the robot arm to detect repulsive force (Fr) when the portafilter makes contact with a group head of an espresso machine, and a controller configured to set a virtual spring having a predetermined elastic modulus (C) based on the repulsive force (Fr) detected by the torque sensor, and to control driving torque (T) of the robot arm depending on the restoring force (Fe) of the virtual spring.

15 Claims, 10 Drawing Sheets

(51) Int. Cl.
*B25J 11/00* (2006.01)
*B25J 9/00* (2006.01)

(58) Field of Classification Search
USPC .......................................................... 700/258
See application file for complete search history.

(56) References Cited

U.S. PATENT DOCUMENTS

| | | | |
|---|---|---|---|
| 2019/0143511 A1* | 5/2019 | Kai ........................ | B25J 11/005 700/254 |
| 2020/0173869 A1* | 6/2020 | Negishi .................. | B25J 13/084 |
| 2020/0375388 A1* | 12/2020 | MacFarlane ....... | G06Q 20/3224 |

* cited by examiner

ROBOT FOR MAKING COFFEE AND METHOD FOR CONTROLLING THE SAME

CROSS-REFERENCE TO RELATED APPLICATIONS

This application claims priority under 35 U.S.C. § 119 to Korean Patent Application No. 10-2019-0084783, filed on Jul. 12, 2019, in the Korean Intellectual Property Office, the entire disclosure of which is hereby expressly incorporated by reference herein.

BACKGROUND

The present disclosure relates to a robot for making coffee that is capable of coupling or detaching a portafilter to or from an espresso machine without damage due to a collision between the espresso machine and the portafilter and a method for the same.

Recently, with the development of robotic technology and artificial intelligence technology, many robots that are able to similarly mimic human behaviors have been developed. For example, a robot for making coffee has been introduced to rapidly make the coffee.

Korean Patent Registration No. 897984 discloses a machine for automatically making drip coffee and tea.

The apparatus includes a hopper to receive coffee powders and formed at a lower portion thereof with an extraction port, a dripper provided at an upper portion of the hopper, having an end portion provided in the hopper to supply water, and performing linear movement and rotational movement in a predetermined section, a driving unit coupled to the dripper to transfer driving force to the dripper and to move the dripper, and a controller to perform a control operation to operate the driving unit depending on preset modes such that the dripper supplies water into the hopper while performing the linear movement and the rotational movement. The controller controls a first transfer shaft motor and a second transfer motor such that a dripper head rotates in a spiral shape.

Korean Patent Registration No. 10-1963657 (filed on Aug. 16, 2018) discloses a container supplying and packaging device for a beverage making apparatus, in which a beverage made by the beverage making apparatus may be discharged to a discharge unit as a transfer robot mounted at the upper center of a body operates.

The apparatus includes a container supply unit through which a can or a storage container is clamped and drawn out by a finger of a transport robot within the operating radius of the transport robot, and a lid coupling unit including a can machine or a receiving container to close, with a lid, and seal the can or the storage container provided from the container supply unit in the state that the beverage is contained in the can or the storage container.

According to the above-described related arts, dripping automatically proceeds, and a separate transfer robot may automatically supply the cup and close the lid.

Further, when applying the above transfer robot, a robot arm may extract coffee from the espresso machine by gripping the portafilter and coupling or decoupling the portafilter to or from the group head of the espresso machine.

However, according to the related art, when the portafilter gripped by the robot arm is coupled to the group head of the espresso machine, the robot or the espresso machine may be damaged due to collision therebetween.

SUMMARY

The present disclosure is suggested to solve the problem occurring in the related art, and to provide a robot for making coffee, capable of coupling to, or decoupling from, a portafilter to an espresso machine without damage due to a collision between the espresso machine and the portafilter, and a method for controlling the same.

According to the present disclosure, there may be provided a robot for making coffee including a robot arm to move with a predetermined degree of freedom, a gripper provided in the robot arm to grip a portafilter, a torque sensor provided in the robot arm to detect repulsive force (Fr) when the portafilter collides with or makes contact with a group head of an espresso machine, and a controller configured to set a virtual spring having a predetermined elastic modulus (C) based on the repulsive force (Fr) detected by the torque sensor, and to control driving torque (T) of the robot arm depending on restoring force (Fe) of the virtual spring.

The torque sensor may be provided in one joint of the robot arm.

The torque sensor may be provided at a distal end of the robot arm.

The controller may set, to a constant, an elastic modulus ($C_x$) of a first virtual spring positioned on a virtual horizontal surface horizontal to one of the portafilter or the group head while the portafilter is inserted into the group head.

The controller may set, to a constant, an elastic modulus ($C_y$) of a second virtual spring positioned in a direction perpendicular to the first virtual spring.

The controller may set the elastic modulus ($C_x$) of the first virtual spring to be inversely proportional to a size of the repulsive force (Fr) measured by the torque sensor.

The controller may set the elastic modulus ($C_x$) of the first virtual spring such that a movement displacement ($\Delta x$) of the robot arm becomes at least ⅔ or more of an outer radius (R) of the portafilter.

The controller may set, to infinity, an elastic modulus ($C_z$) of a third virtual spring positioned in a virtual axis direction perpendicular to one of the portafilter or the group head, while the portafilter is inserted into the group head.

The controller may set, to a constant, an elastic modulus ($C_z$) of a third virtual spring positioned in a virtual axis direction perpendicular to one of the portafilter or the group head, while the portafilter is rotated in the group head.

The controller may set the elastic modulus ($C_z$) of the third virtual spring to be inversely proportional to a size of the repulsive force (Fr) measured by the torque sensor.

The controller may set the elastic modulus ($C_z$) of the third virtual spring such that a movement displacement ($\Delta z$) of the robot arm becomes three times greater than a displacement of the portafilter when the portafilter is rotated at a degree of 90° or more in the group head.

The controller may set, to infinity, the elastic modulus ($C_x$) of the first virtual spring positioned on the virtual horizontal surface horizontal to one of the portafilter or the group head while the portafilter is rotated in the group head.

The controller may set, to infinity, an elastic modulus ($C_y$) of a second virtual spring positioned in a direction perpendicular to the first virtual spring.

Meanwhile, according to the present disclosure, there may be provided a method for controlling a robot for making coffee, which includes gripping a portafilter by a gripper provided at an end portion of a robot arm and moving the portafilter into a group head of an espresso machine by the robot arm, detecting repulsive force (Fr) when the portafilter collides with or makes contact with the group head of the espresso machine, and setting a virtual spring having a predetermined elastic modulus (C) by reflecting the repulsive force (Fr) detected, and of controlling driving torque (T) of the robot arm depending on restoring force (Fe) of the virtual spring.

The setting a virtual spring may include setting, to a constant, an elastic modulus (Cx) of a first virtual spring positioned on a virtual horizontal surface horizontal to one of the portafilter or the group head and setting, to infinity, an elastic modulus (Cz) of a third virtual spring positioned in a virtual axis direction perpendicular to one of the portafilter or the group head, while the portafilter is inserted into the group head.

The elastic modulus (Cx) of the first virtual spring may be set to be inversely proportional to a size of the repulsive force (Fr) measured.

The elastic modulus (Cx) of the first virtual spring is set such that a movement displacement (Δx) of the robot arm may become at least ⅔ or more of an outer radius (R) of the portafilter.

The setting the virtual spring may include setting, to a constant, an elastic modulus (Cz) of a third virtual spring positioned in a virtual axis direction perpendicular to one of the portafilter or the group head, and setting, to infinity, an elastic modulus (Cx) of a first virtual spring positioned on a virtual horizontal surface horizontal to one of the portafilter or the group head, while the portafilter is rotated in the group head.

The elastic modulus (Cz) of the third virtual spring may be set to be inversely proportional to a size of the repulsive force (Fr) measured by a torque sensor.

The elastic modulus (Cz) of the third virtual spring is set such that a movement displacement (Δz) of the robot arm becomes at least three times greater than a movement displacement of the portafilter when the portafilter is rotated at a degree of 90° or more in the group head.

As described above, in the robot for making coffee and the method for controlling the same, the torque sensor is provided at the side of the robot arm, and the virtual spring model is employed by reflecting the repulsive force detected by the torque sensor when the portafilter collides with or contacts the group head, thereby controlling the driving torque of the robot arm.

Accordingly, when the portafilter gripped by the robot arm is coupled to the group head of the espresso machine, even if the portafilter collides with the group head, the damage to the robot or the espresso machine may be prevented by appropriately controlling the torque acting on the distal end of the robot arm and the displacement.

DETAILED DESCRIPTION OF THE EMBODIMENTS

Figure 1:
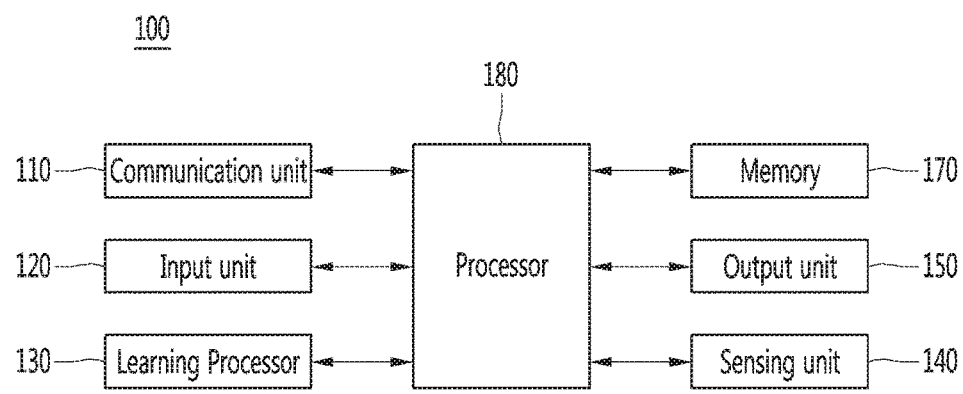
FIG. 1 illustrates an artificial intelligence (AI) device according to an embodiment of the present disclosure.

Hereinafter, the present embodiment will be described with reference to the accompanying drawings in detail.

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use, purpose, or field.

The robot includes a driving unit, which may include an actuator or a motor, and may perform various physical operations such as moving a robot joint. In addition, a movable robot may include a wheel, a brake, a propeller, and the like in a driving unit, and may travel on the ground through the driving unit or fly in the air.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

FIG. 1 illustrates an AI device 100 including a robot according to an embodiment of the present disclosure. The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

Figure 3:
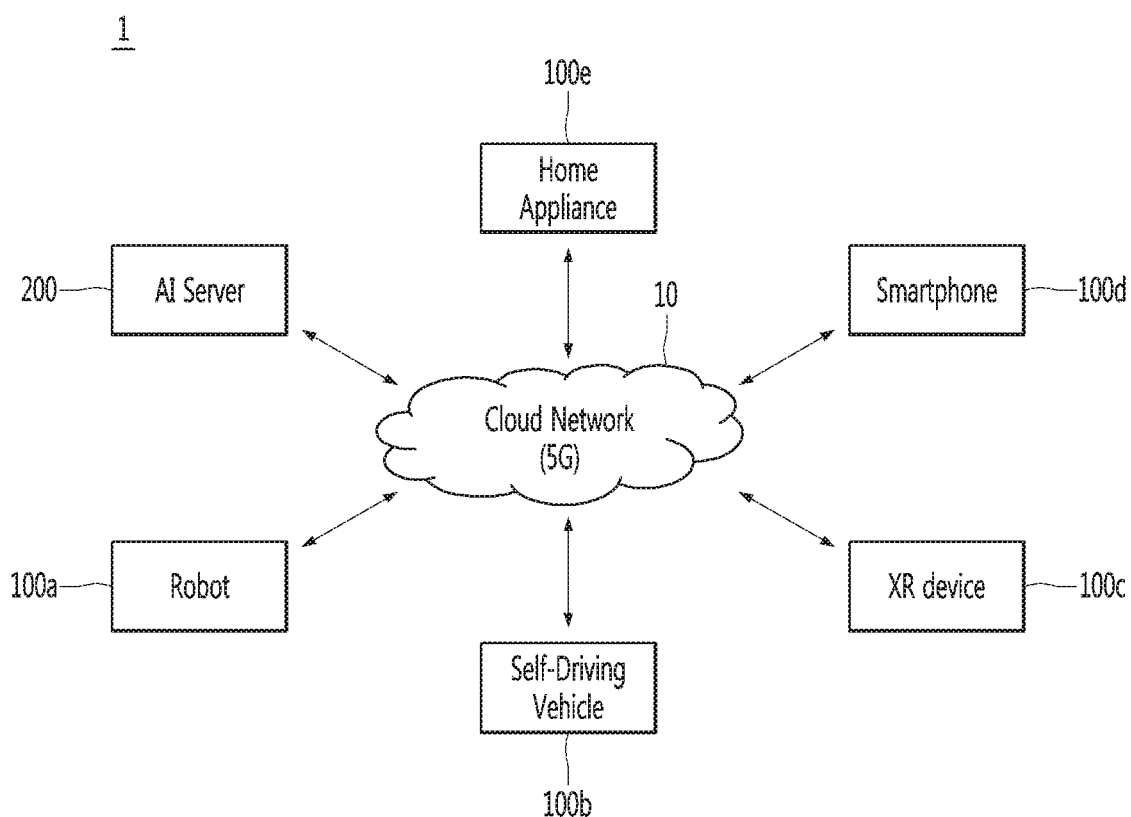
FIG. 3 illustrates an AI system according to an embodiment of the present disclosure.

The communication unit 110 may transmit and receive data to and from external devices such as other AI devices 100a to 100e and the AI server 200 by using wire/wireless communication technology (See FIG. 3). For example, the communication unit 110 may transmit and receive sensor information, a user input, a learning model, and a control signal to and from external devices. The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data. The input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

The learning processor 130 may perform AI processing together with the learning processor 240 of the AI server 200. The learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors, such as, for example, a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense. The output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation. To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information from the user input and may determine the user's requirements based on the acquired intention information. The processor 180 may acquire the intention information corresponding to the user input by using at least one of a speech to text (STT) engine for converting speech input into a text string or a natural language processing (NLP) engine for acquiring intention information of a natural language. At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
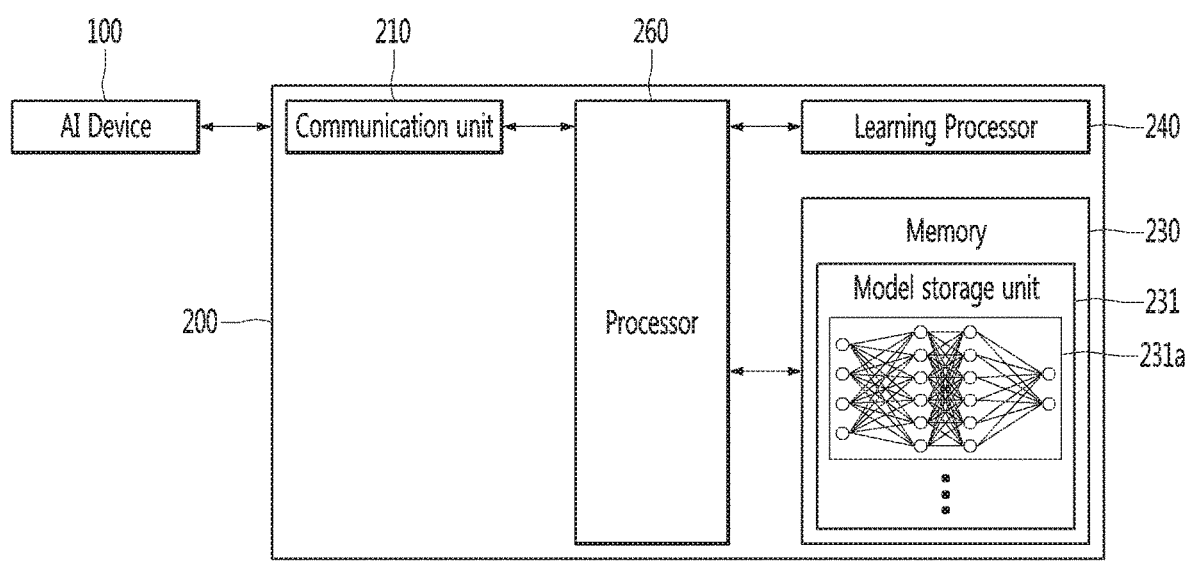
FIG. 2 illustrates an AI server according to an embodiment of the present disclosure.

FIG. 2 illustrates an AI server 200 connected to a robot according to an embodiment of the present disclosure. Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. The AI server 200 may be included as a partial configuration of the AI device 100, and may perform at least part of the AI processing together.

The AI server 200 may include a communication unit 210, a memory 230, a learning processor 240, a processor 260, and the like. The communication unit 210 can transmit and receive data to and from an external device such as the AI device 100. The memory 230 may include a model storage unit 231. The model storage unit 231 may store a learning or learned model (or an artificial neural network 231a) through the learning processor 240. The learning processor 240 may learn the artificial neural network 231a by using the learning data. The learning model may be used in a state of being mounted on the AI server 200 of the artificial neural network, or may be used in a state of being mounted on an external device such as the AI device 100. The learning model may be implemented in hardware, software, or a combination of hardware and software. If all or part of the learning models are implemented in software, one or more instructions that constitute the learning model may be stored in memory 230. The processor 260 may infer the result value for new input data by using the learning model and may generate a response or a control command based on the inferred result value.

FIG. 3 illustrates an AI system 1 according to an embodiment of the present disclosure. Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network. That is, the devices 100a to 100e and AI server 200 of the AI system 1 may be connected to each other through the cloud network 10. In particular, each of the devices 100a to 100e and AI server 200 may communicate with each other through a base station, but may directly communicate with each other without using a base station.

The AI server 200 may include a server that performs AI processing and a server that performs operations on big data. The AI server 200 may be connected to at least one of the AI devices of the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

The AI server 200 may learn the artificial neural network according to the machine learning algorithm instead of the AI devices 100a to 100e, and may directly store the learning model or transmit the learning model to the AI devices 100a to 100e.

The AI server 200 may receive input data from the AI devices 100a to 100e, may infer the result value for the received input data by using the learning model, may generate a response or a control command based on the inferred result value, and may transmit the response or the control command to the AI devices 100a to 100e. Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

The robot 100a, to which the AI technology is applied, may be implemented as a guide robot, a carrying robot, a cleaning robot, a wearable robot, an entertainment robot, a pet robot, an unmanned flying robot, or the like. The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200. The robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan. The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/ interaction of the user. The robot 100a may acquire the intention information of the interaction due to the user's operation or speech utterance, and may determine the response based on the acquired intention information, and may perform the operation.

Figure 4:
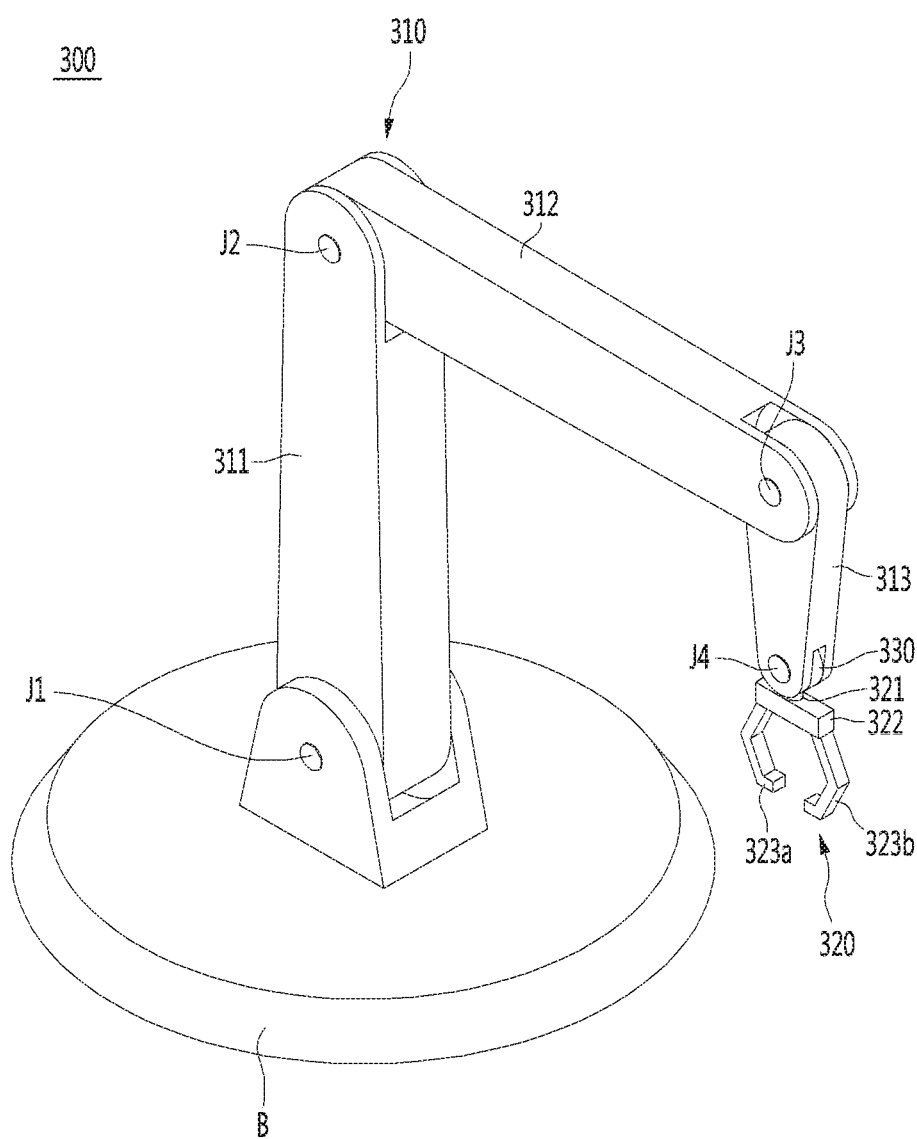
FIG. 4 is a view illustrating a robot for making coffee according to an embodiment of the present disclosure.
Figure 5:
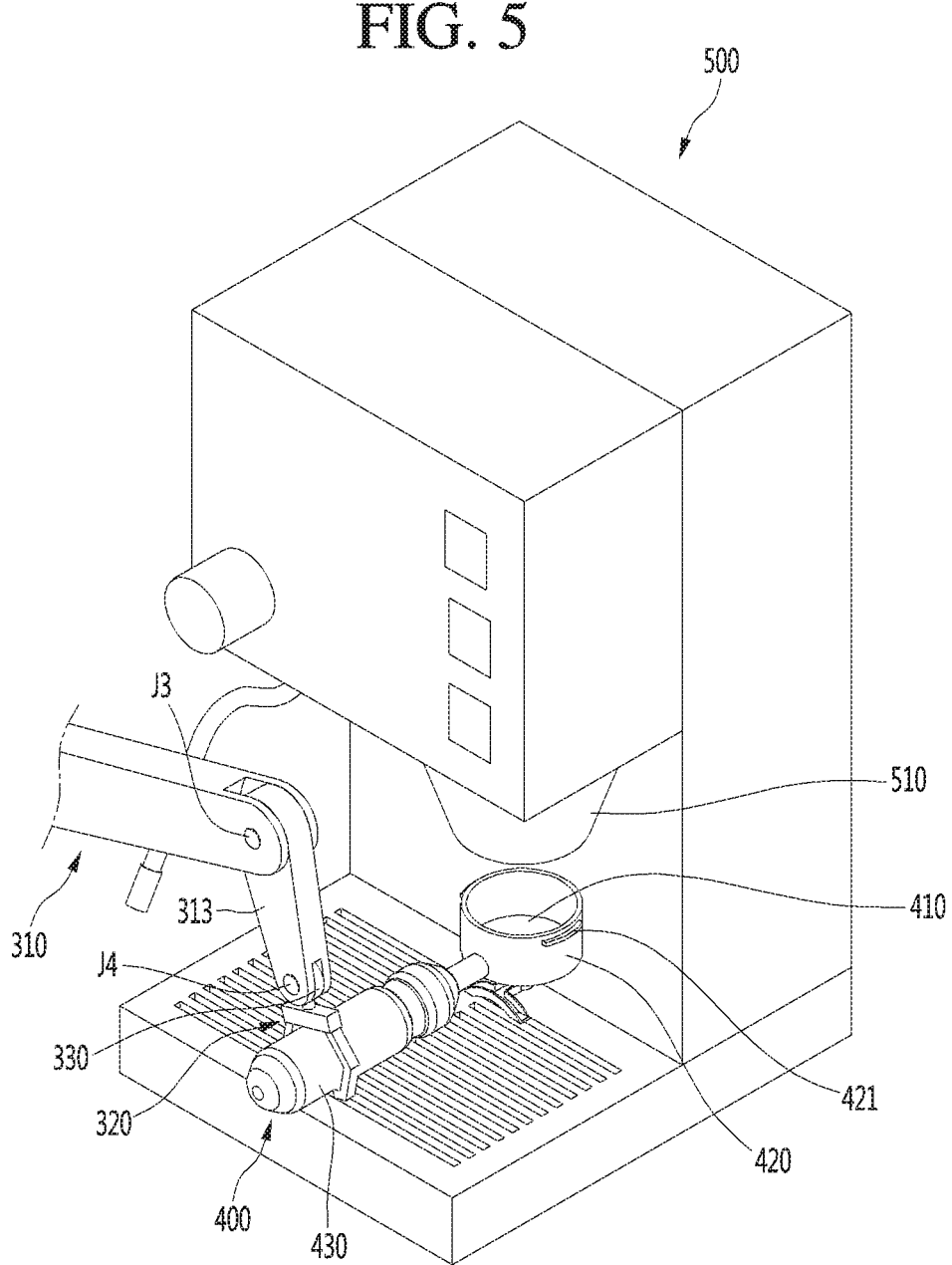
FIG. 5 is a view illustrating a portion of the robot for making coffee and an espresso machine of the present disclosure.
Figure 6:
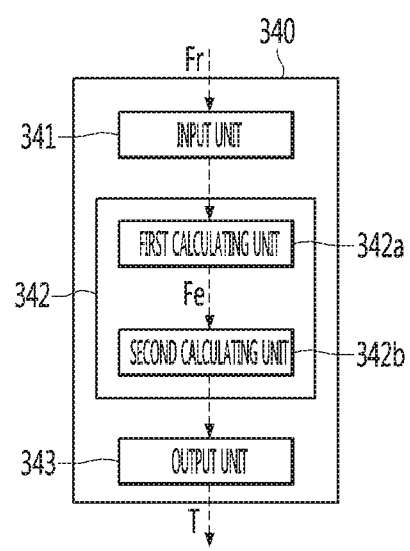
FIG. 6 is a block diagram illustrating a controller applied to the robot for making coffee according to the present disclosure.

FIG. 4 is a view illustrating a robot for making coffee according to an embodiment of the present disclosure. FIG. 5 is a view illustrating a portion of the robot for making coffee and an espresso machine of the present disclosure. FIG. 6 is a block diagram illustrating a controller applied to the robot for making coffee according to the present disclosure.

The robot for making coffee according to an embodiment of the present disclosure may be applied to all of the AI device, the AI server, and AI system described above, but is not limited thereto.

The robot 300 may mount a portafilter 400 having ground coffee powders contained therein to a group head 510 of the espresso machine 500 or may remove the portafilter 400 from the group head 510 of the espresso machine 500.

The portafilter 400 includes a portable basket 420 having a filter on a base 410, and a handle 430 to be gripped by the robot 300 may be provided at one side of the portable basket 420. The portable basket 420 may have a circular shape, and a pair of guide protrusions 421 may be provided on an outer circumferential surface of the portable basket 420. The ground coffee may be received inside the portable basket 420 and then tamped.

The espresso machine 500 may grind coffee beans to supply the ground coffee to the portafilter 400, and supply water having an extraction temperature to the group head 510 connected with the portafilter 400. The group head 510 is provided in the lower portion thereof with a hole 510H into which an upper portion of the portable basket 420 may be fitted. A pair of seating grooves 511 may be provided at opposite sides of the hole 510H and correspond to the shapes of the guide protrusions 421 of the portable basket 420.

The hole 510H and the seating grooves 511 of the group head 510 may be engaged with the upper portion and the guide protrusion 421 of the portable basket 420, respectively, and the portable basket 420 may be rotated up to 90° inside the hole 510H of the group head 510. When rotated in a forward direction inside the hole 510H of the group head 510, the portable basket 420 may be coupled while moving upward in the group head 510. When rotated in a reverse direction inside the hole 510H of the group head 510, the portable basket 420 may be decoupled while moving downward in the group head 510.

In this embodiment, when the guide protrusions 421 of the portable basket 420 and the seating grooves 511 of the group head 510 are in corresponding positions, the portable basket 420 may be fitted into the hole 510H of the group head 510. Once the portable basket is rotated up to 90°, the portable basket 420 may be stably coupled to the hole 510H of the group head 510.

After the robot 300 couples the portable basket 420 of the portafilter 400 to the hole 510H of the group head 510, the water having the extraction temperature passes through the ground coffee contained in the portable basket 420 while the ground coffee is pressed. Accordingly, espresso is extracted from the ground coffee through the filter provided at the base 410.

The robot 300 may include a robot arm 310, a gripper 320, a torque sensor 330, and a controller 340. The robot arm 310 has the form of an articulated robot, and a distal end of the robot arm 310 may have '6' or more degrees of freedom. The robot arm 310 may include a plurality of links 311, 312, and 313 that are linked with each other by a plurality of rotary joints J1, J2, and J3. One link 311 of the robot arm 310 may be connected with a base B maintained in a fixed state and a link 313 at an opposite end of the robot arm 300, that is, the distal end (hereinafter referred to as "distal end 313") of the robot arm 310 may be connected to the gripper 320.

The gripper 320, which is configured to be rotatable and capable of gripping the handle 430 at the side of the portafilter 400, may be provided at the distal end 313 of the robot arm 310. The gripper 320 may include a coupling member 321 rotatably provided at the distal end 313 of the robot arm, a base member 322 coupled to a distal end of the coupling member 321, and a pair of fingers 323a and 323b. The pair of fingers 323a and 323b may be movable while sliding with respect to the base member 322, but is not limited thereto.

The fingers 323a and 323b may grip the handle 430 at the side of the portafilter 400 and may be moved toward or away from each other on the base member 322. As such, the fingers 323a and 323b may be able to grasp different sized portafilters. In this embodiment, the fingers 323a and 323b may grip a cup or container containing coffee extracted from the espresso machine 500 and may be variously configured in the form of a joint.

The torque sensor 330 may be provided on the robot arm 310 and may detect the repulsive force Fr due to the collision or contact of the portafilter 400 with the group head 510. The torque sensor 330 may be provided as a plurality of torque sensors 330 so as to be provided at all of the rotary joints J1, J2, and J3 of the robot arm, or the torques sensor 330 may be selectively provided at only some of the rotary joints J1, J2, and J3.

In this embodiment, the torque sensor 330 may be provided at the distal end 313 of the robot arm, particularly, the rotary joint J4 by which the robot arm 310 and the gripper 320 are connected. When the portafilter 400 gripped by the gripper 320 collides with or contacts the group head 510, the torque sensor 330 provided at the rotary joint J4 connecting the robot arm 310 and the gripper 320 experiences the greatest repulsive force.

The controller 340 may apply a virtual spring model to the distal end 313 of the robot arm and reflect the repulsive force Fr detected by the torque sensor 330, thereby calculating a driving torque T necessary for the distal end 313 of the robot arm.

The distal end 313 of the robot arm may be an end portion which may be a portion on which the gripper 320 is mounted, and may be an end portion of the robot arm 310 to which torque necessary for the rotary joints J1, J2, J3, and J4 of the robot arm 310 is finally transmitted.

The controller 340 may include an input unit 341 to receive the repulsive force Fr measured by the torque sensor 330, a calculating unit 342 to calculate the driving torque T of the robot arm 310 by applying the virtual spring model based on the repulsive force Fr provided to the input unit 341, and an output unit 343 to output the driving torque T calculated by the operating unit 341 as driving force to drive the rotary joins J1, J2, and J3 of the robot arm.

The calculating unit 342 may include a first calculating unit 342a to calculate the elastic modulus and the restoring force Fe of the virtual spring S by reflecting the repulsive force measured by the torque sensor 330, and a second calculating unit 342b to set the restoring force Fe of the virtual spring as the driving torque T necessary for the distal end 313 of the robot arm, and to distribute the torque as torque necessary for the rotary joints J1, J2, J3 of the robot arm.

The virtual spring model may employ first and second virtual springs Sx and Sy positioned in a horizontal direction to one of the portafilters 400 or the group heads 510 and a third virtual spring Sz positioned in the vertical direction to one of the portafilters 400 or the group heads 510.

The first and second virtual spring Sx and Sy may be an X-axis virtual spring Sx and a Y-axis virtual spring positioned in directions perpendicular to each other on the same horizontal surface, and the third virtual spring Sz may employ a Z-axis virtual spring Sx positioned perpendicularly to the horizontal surface on which the X-axis virtual spring Sx and the Y-axis virtual spring are positioned.

The first calculating unit 342*a* may set elastic moduli Cx, Cy, and Cz of the virtual springs Sx, Sy, and Sz to be constants so as one or more of the elastic moduli Cx, Cy, and Cz may be set to be inversely proportional to the repulsive force Fr measured by the torque sensor 330. Depending on the motion of the portafilter 400 relative to the group head, the first calculating unit 342*a* may set the elastic modulus Cx of an X-axis virtual spring Sx or the elastic modulus Cy of the Y-axis virtual spring Sy to be a first or second constant, and then set the elastic modulus Cz of the Z-axis virtual spring Sz to be a third constant.

For example, when the portafilter 400 collides with the group head 510 while being inserted into the group head 510, the elastic modulus Cx of the X-axis virtual spring Sx or the elastic modulus Cy of the Y-axis virtual spring Sy may be set to be inversely proportional to the repulsive force Fr measured by the torque sensor 330. In this case, the elastic modulus Cz of the virtual spring Sz may be set to infinity.

In addition, the elastic modulus Cx of the X-axis virtual spring Sx and the elastic modulus Cy of the Y-axis virtual spring Sy may be set such that movement displacements Δx and Δy of the robot arm become at least ⅔ of the outer radius R of the pocket basket 420 of the portafilter 400.

Once the portafilter 400 is inserted into the group head 510, and the robot arm 300 begins to rotate the portafilter 400 in the group head 510, the elastic modulus of the X-axis virtual spring Sx or the elastic modulus of the Y-axis virtual spring Sy may be set to different constants and the elastic modulus Cz of the Z-axis virtual spring Sz may be similarly set to be inversely proportional to the repulsive force Fr measured by the torque sensor 330. In this case, the elastic modulus Cx of the X-axis virtual spring Sx or the elastic modulus Cy of the Y-axis virtual spring Sy may be set to infinity.

In addition, the elastic modulus Cz of the Z-axis virtual spring may be set such that a movement displacement Δz of the robot arm becomes at least three times greater than a movement displacement of the portafilter 400 when the pocket basket 420 of the portafilter 400 is rotated 90° or more in the group head 510.

When the first calculation unit 342*a* sets the elastic moduli C of the virtual springs as described above, the first calculation unit 342*a* may calculate the restoring force Fe due to displacements Δ of the virtual springs according to the following equation.

$$Fe = C * \Delta \quad \text{[Equation 1]}$$

The second calculating unit 342*b* sets restoring force Fe of the virtual spring calculated by the first calculating unit 342*a* as described above, as the driving torque T necessary for the distal end 313 of the robot arm, and the driving torque T may be distributed into torques necessary to the rotary joints J1, J2, J3, and J4 through Jacobian matrix (Jacobian Transformation).

The output unit 343 outputs the torque necessary for the rotary joints J1, J2, J3, and J4 of the robot arm calculated by the second calculating unit 342*b* as the driving force of each of the rotary joints J1, J2, J3, and J4. Accordingly, the controller 340 may drive the respective rotary joints J1, J2, J3, and J4 of the robot arm.

Therefore, when each of rotary joints J1, J2, and J3 of the robot arm 310 is driven based on the torque required for each of the rotary joints J1, J2, and J3, the distal end 313 of the robot arm may be moved based the required driving torque T, and the gripper 320 connected with the distal end 313 of the robot arm and the portafilter 400 gripped by the gripper 320 may be moved to the set position.

In other words, when the portafilter 400 gripped by the distal end 313 of the robot arm is coupled to the group head 510, the distal end 313 of the robot arm may move with an appropriate torque, thereby preventing damage to the robot or the espresso machine.

Figure 7A:
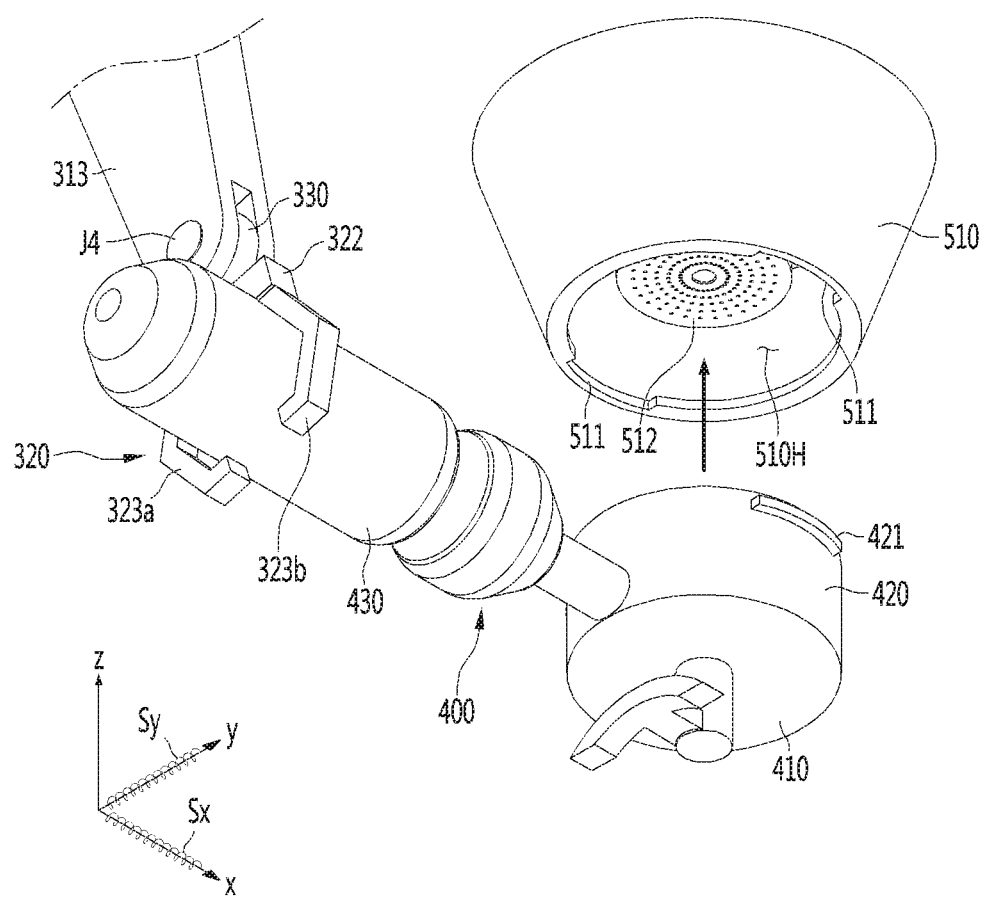
FIGS. 7A to 7B are perspective views illustrating a process of coupling a portafilter to a group head of an espresso machine by the robot for making coffee according to the present disclosure
Figure 7B:
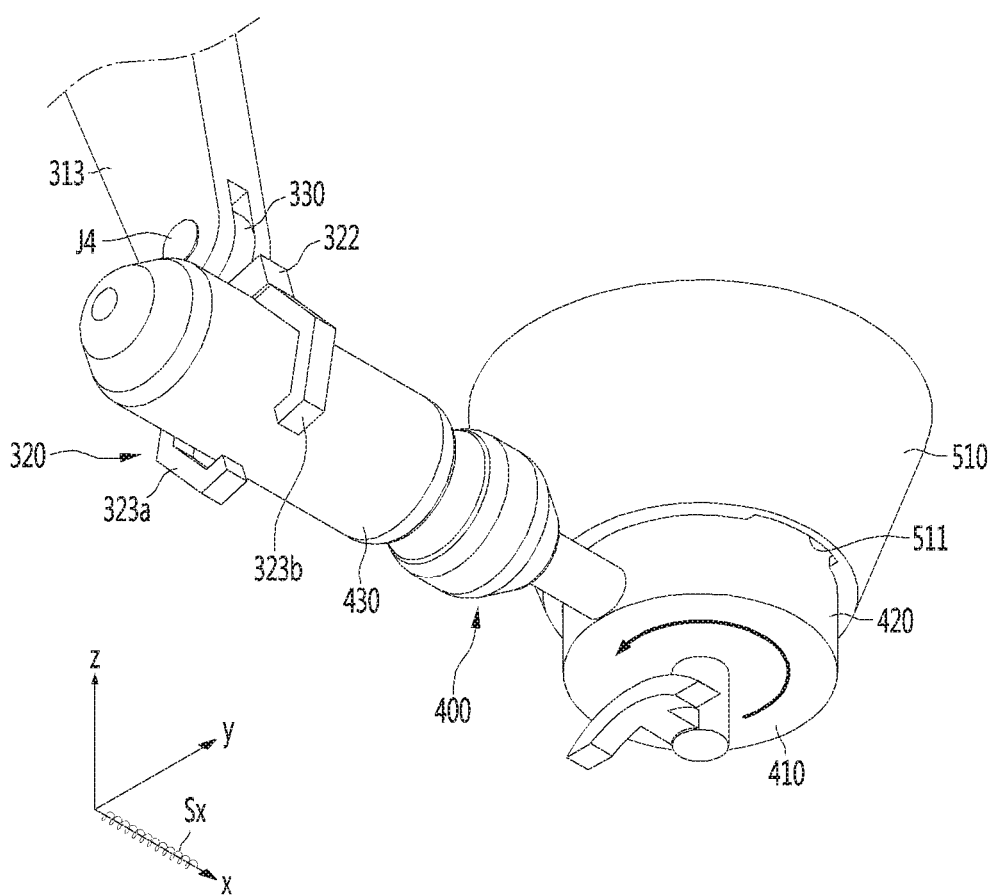
Figure 8A:
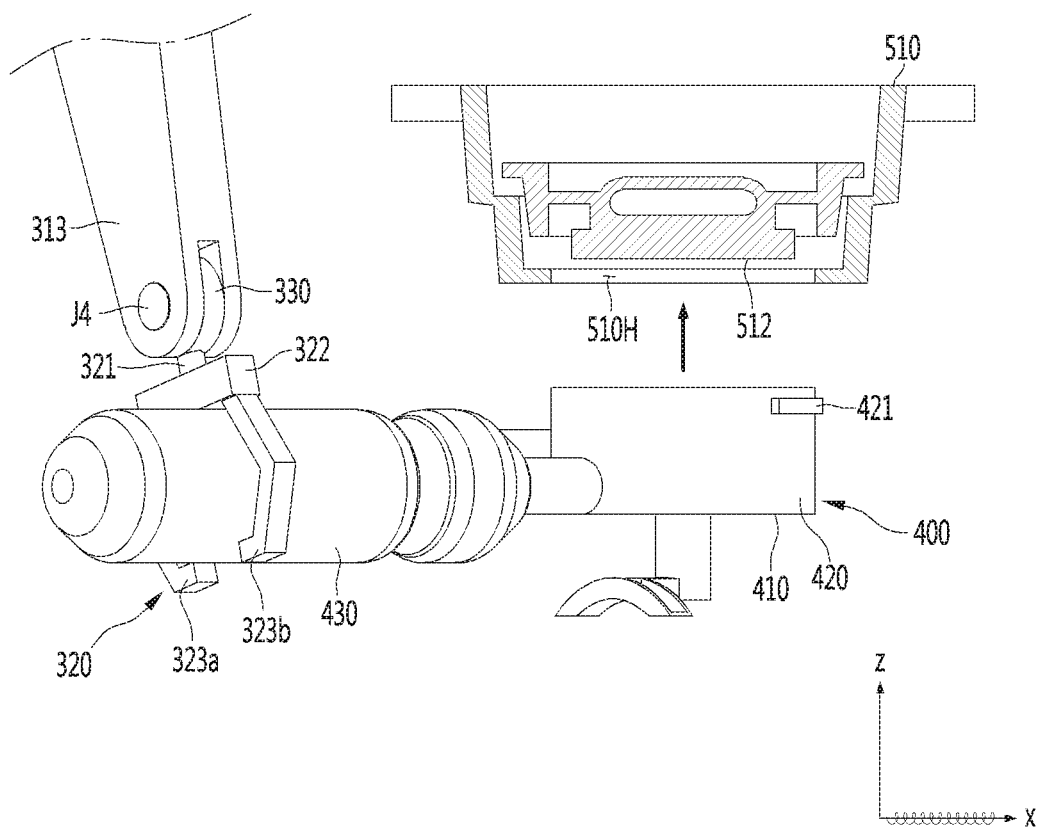
FIGS. 8A to 8B are side cross-sectional views illustrating a process of coupling a portafilter to a group head of an espresso machine by the robot for making coffee according to the present disclosure.
Figure 8B:
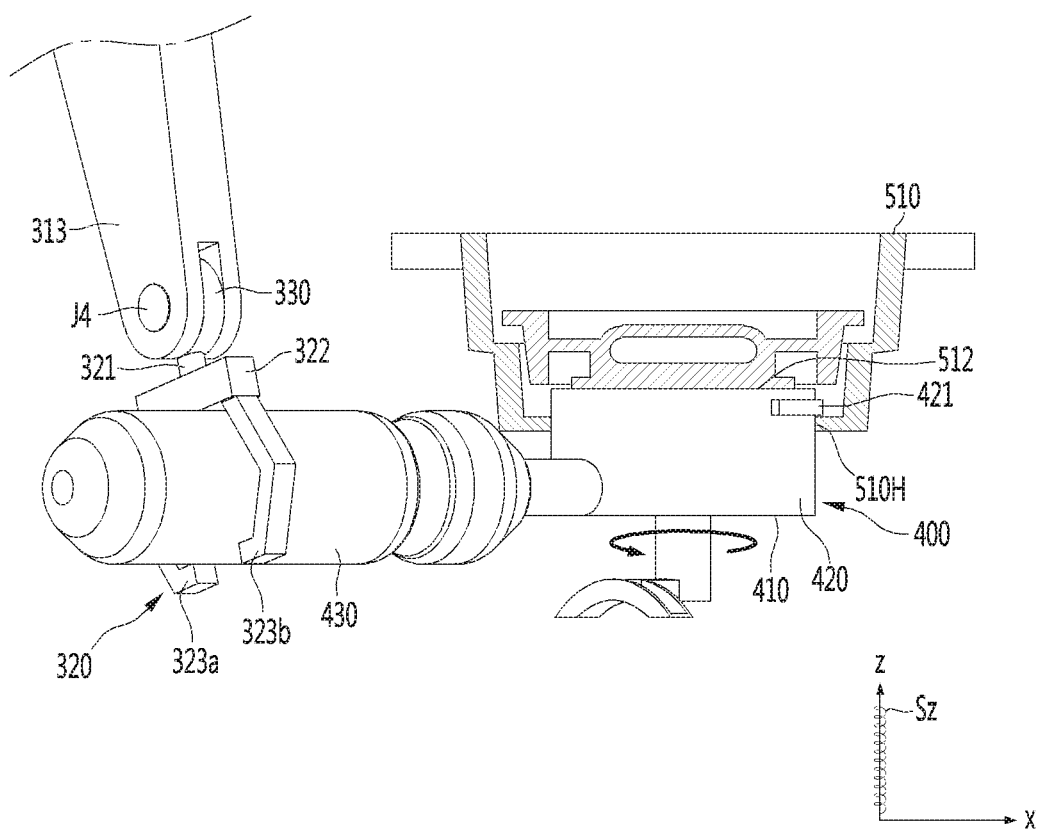

FIGS. 7A to 7B are perspective views illustrating a process of coupling a portafilter to a group head of an espresso machine by the robot for making coffee according to the present disclosure. FIGS. 8A to 8B are side cross-sectional views illustrating a process of coupling a portafilter to a group head of an espresso machine by the robot for making coffee according to the present disclosure.

As illustrated in FIGS. 7A and 8A, when each of the rotary joints J1 to J4 of the robot arm is driven, the portafilter 400 gripped by the distal end 313 of the robot arm is moved to the lower portion of the group head 510.

When the portable basket 420 on the side of the portafilter 400 collides with the lower portion of the group head 510, the torque sensor 330 provided at the distal end 313 of the robot arm may measure the repulsive force Fr acting on the distal end 313 of the robot arm Fr.

When receiving the repulsive force Fr measured by the torque sensor 330, the controller 340 may apply the X-axis virtual spring Sx and the Y-axis virtual spring Sy to the distal end of the robot arm 310 and may set the elastic modulus of the X-axis virtual spring Sx and the elastic modulus of the Y-axis virtual spring Sy to be constants such that the elastic modulus of the X-axis virtual spring Sx and the elastic modulus of the Y-axis virtual spring Sy are inversely proportional to the repulsive force Fr of the torque sensor 330.

As described above, when the elastic modulus of the X-axis virtual spring Sx and the elastic modulus of the Y-axis virtual spring Sy are set, and the movement displacement Δx of the X-axis virtual spring Sx and the movement displacement Δy of the Y-axis virtual spring Sy are reflected, the repulsive force of the X-axis virtual spring Sx and the repulsive force of the Y-axis virtual spring Sy may be calculated.

The controller 340 calculates the torque T of the distal end 313 of the robot arm based on the repulsive force of the X-axis virtual spring Sx and the repulsive force of the Y-axis virtual spring Sy, and may provide torque T necessary for each of rotary torques J1 to J4.

Accordingly, the distal end 313 of the robot arm is moved by a predetermined displacement with predetermined torque T in the horizontal direction, so the upper portion and the guide protrusions 421 of the portable basket 420 of the portafilter 400 may be inserted into and shape-matched to the hole 510H and the seating grooves 511 of the group head 510, respectively.

Then, as illustrated in FIGS. 7B and 8B, when each of the rotary joints J1 to J4 of the robot arm is driven, the upper portion of the portafilter 400 gripped by the distal end 313 of the robot arm may be rotated inside the hole 510H of the group head 510.

The controller 340 may apply the Z-axis virtual spring Sz to the distal end 313 of the robot arm, and may set the elastic modulus of the Z-axis virtual spring Sz to a constant such that the modulus of the Z-axis virtual spring Sz is inversely proportional to the repulsive force Fr of the torque sensor 330.

As described above, when the elastic modulus of the Z-axis virtual spring Sz is set and the movement displacement $\Delta z$ of the Z-axis virtual spring Sz is reflected, the repulsive force of the Z-axis virtual spring Sz may be calculated.

The controller 340 may calculate the torque T of the distal end 313 of the robot arm based on the repulsive force of the Z-axis virtual spring Sx, and may provide the torque T necessary for each of the rotary joints J1 to J4 of the robot arm.

Accordingly, the distal end 313 of the robot arm is rotated at a predetermined angle by the torque T in the vertical direction, so the upper portion of the portable basket 420 of the portafilter 400 may be inserted into and fixed to a lower portion of the hole 510H of the group head 510 to make close contact with the hole 510H of the group head 510.

When the process of causing the distal end 313 of the robot arm to couple the portafilter 400 to the group head 510 is reversed, a process of causing the distal end 313 of the robot arm to decouple the portafilter 400 from the group head 510 may be performed, and the details thereof will be omitted.

Figure 9:
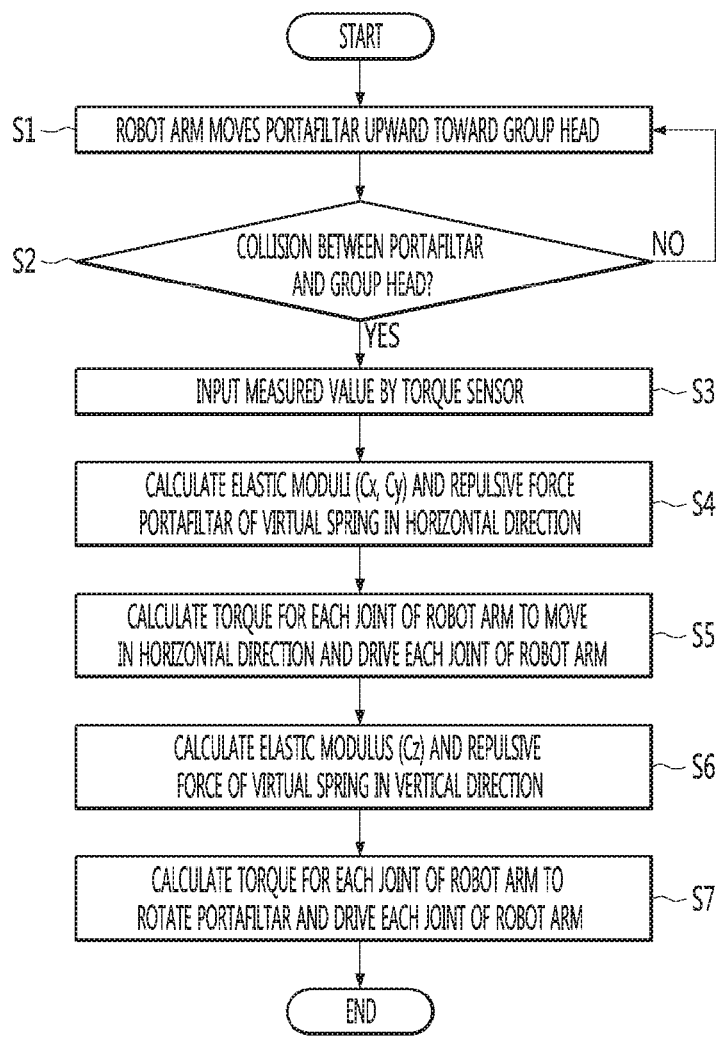
FIG. 9 is a flowchart illustrating a method for controlling the robot for making coffee according to the present disclosure.

FIG. 9 is a flowchart illustrating a control method of the robot 300 according to the present disclosure.

Regarding the control method of the robot 300 according to the present disclosure, the robot arm may grip the portafilter, and move the portafilter upward toward the group head (see S1). When the upper portion of the portafilter collides with the lower portion of the group head, the measured value by the torque sensor may be input as repulsive force due to the collision transmitted to the robot arm (see S2 and S3). In this embodiment, if there is no collision between the portafilter and the group head, the robot arm may move with a previously set torque.

The elastic modulus Cx and the elastic modulus Cy and the restoring force Fe of the virtual springs Sx and Sy positioned in the horizontal direction may be calculated based on the measured value by the torque sensor (see S4). When the elastic moduli of the virtual springs Sx and Sy positioned in the horizontal direction are set to constants, the displacement of the virtual spring in the horizontal may occur, the restoring force of the virtual spring in the horizontal direction may be calculated, and the torque may be set in the horizontal direction to the distal end of the robot arm based on the restoring force.

When the torque is set in the horizontal direction to the distal end of the robot arm, the torque for each joint of the robot arm may be calculated to move the portafilter in the horizontal direction, and each joint of the robot arm may be driven by the torque for each joint of the robot arm (See S5). Accordingly, the upper portion of the portafilter may be inserted into the hole of the group head as the portafilter moves at a predetermined distance in the horizontal direction under the group head.

Thereafter, the elastic modulus and the restoring force of the virtual spring positioned in the vertical direction may be calculated based on the measured value by the torque sensor (see S6). When the elastic modulus of the virtual spring in the vertical direction is set to a constant, the restoring force of the virtual spring in the vertical direction may be calculated based on the displacement of the virtual spring in the vertical direction, and the torque may be set in the vertical direction at the distal end of the robot arm.

When the torque is set in the vertical direction to the distal end of the robot arm, the torque for each joint of the robot arm may be calculated to rotate the portafilter in the vertical direction, and each joint of the robot arm may be driven by the torque for each joint of the robot arm (See S7).

Accordingly, as the portafilter is rotated till 90° inside the hole of the group head, the upper portion of the portafilter may be moved upward inside the hole of the group head and the portafilter may be fixed to the inner part of the hole of the group head.

While the present disclosure has been described with reference to exemplary embodiments, it will be apparent to those skilled in the art that various changes and modifications may be made without departing from the spirit and scope of the present disclosure.

Therefore, the exemplary embodiments of the present disclosure are provided to explain the spirit and scope of the present disclosure, but not to limit them, so that the spirit and scope of the present disclosure is not limited by the embodiments.

The scope of the present disclosure should be construed on the basis of the accompanying claims, and all the technical ideas within the scope equivalent to the claims should be included in the scope of the present disclosure.

What is claimed is:

1. A robot to make coffee, the robot comprising:
   a robot arm to move with at least one degree of freedom;
   a gripper connected to the robot arm, the gripper being configured to grip a portafilter;
   a torque sensor provided at the robot arm to detect a repulsive force when the portafilter makes contact with a group head of an espresso machine; and
   a controller configured to:
      set a virtual spring having a predetermined elastic modulus based on the repulsive force detected by the torque sensor; and
      control a driving torque of the robot arm based on a restoring force of the virtual spring,
   wherein the virtual spring includes a first virtual spring positioned on a virtual horizontal plane relative to one of the portafilter or the group head, the first virtual spring having a first elastic modulus, and a second virtual spring perpendicular to the first virtual spring and positioned on the virtual horizontal plane, the second virtual spring having a second elastic modulus, and a third virtual spring positioned along a virtual axis extending normal to the virtual horizontal plane, the third virtual spring having a third elastic modulus, and
   wherein the controller is configured to set the first elastic modulus to a first constant while the portafilter is being inserted into the group head,
   wherein the controller is configured to set the second elastic modulus to a second constant while the portafilter is being inserted into the group head,
   wherein the controller is configured to set the third elastic modulus to infinity while the portafilter is being inserted into the group head, and
   wherein the controller is configured to set the third elastic modulus to a third constant while the portafilter is rotated in the group head.

2. The robot of claim 1, wherein the robot arm includes at least one joint, and wherein the torque sensor is provided in a first joint of the at least one joint.

3. The robot of claim 1, wherein the robot includes a base, wherein the robot arm includes a proximal end adjacent to the base and a distal end spaced from the base, and wherein the torque sensor is provided at the distal end of the robot arm.

4. The robot of claim 1, wherein the controller is configured to set the first constant to be inversely proportional to a size of the repulsive force measured by the torque sensor.

5. The robot of claim 1, wherein the controller is configured to set the first constant such that a movement displacement of the robot arm is equal to or greater than at least 2/3 of an outer radius of the portafilter.

6. The robot of claim 1, wherein the controller is configured to set the third constant to be inversely proportional to a size of the repulsive force measured by the torque sensor.

7. The robot of claim 1, wherein the controller is configured to set the third constant such that a movement displacement of the robot arm is equal to or greater than three times a movement displacement of the portafilter when the portafilter is rotated 90° or more in the group head.

8. The robot of claim 1, wherein the controller is configured to set the first elastic modulus to infinity while the portafilter is being rotated in the group head.

9. The robot of claim 8, wherein the controller is configured to set the second elastic modulus to infinity while the portafilter is being rotated in the group head.

10. A method of controlling a robot to make coffee, the method comprising:
gripping a portafilter by a gripper provided at an end portion of a robot arm of the robot;
moving the portafilter into a group head of an espresso machine by the robot arm;
detecting a repulsive force when the portafilter makes contact with the group head of the espresso machine;
setting, by a controller of the robot, a virtual spring having a predetermined elastic modulus based on the detected repulsive force; and
controlling a driving torque of the robot arm based on a restoring force of the virtual spring,
wherein the virtual spring includes a first virtual spring positioned on a virtual horizontal plane relative to one of the portafilter or the group head, a second virtual spring perpendicular to the first virtual spring and positioned on the virtual horizontal plane and a third virtual spring positioned along a virtual axis extending normal to the virtual horizontal plane,
wherein moving the portafilter includes inserting the portafilter into the group head,
wherein, while the portafilter is being inserted into the group head, setting the virtual spring includes setting a first elastic modulus of the first virtual spring to a first constant and a second elastic modulus of the second virtual spring to a second constant and setting a third elastic modulus of the third virtual spring to infinity,
wherein moving the portafilter includes rotating the portafilter in the group head, and
wherein, while the portafilter is being rotated in the group head, setting the virtual spring includes setting a third elastic modulus of the third virtual spring to a third constant.

11. The method of claim 10 wherein detecting the repulsive force includes measuring the detected repulsive force with a torque sensor, and
wherein the first constant is set to be inversely proportional to a size of the detected repulsive force.

12. The method of claim 10, wherein the first constant is set such that a movement displacement of the robot arm is equal to or greater than at least 2/3 of an outer radius of the portafilter.

13. The method of claim 10,
wherein, while the portafilter is being rotated in the group head, setting the virtual spring includes setting the first elastic modulus of the first virtual spring to infinity.

14. The method of claim 13, wherein detecting the repulsive force includes measuring the detected repulsive force with a torque sensor, and
wherein the third constant is set to be inversely proportional to a size of the detected repulsive force.

15. The method of claim 14, wherein the third constant is set such that a movement displacement of the robot arm is equal to or greater than three times a movement displacement of the portafilter when the portafilter is rotated 90° or more in the group head.

* * * * *